United States Patent
Day

(10) Patent No.: US 6,749,511 B2
(45) Date of Patent: Jun. 15, 2004

(54) WEBSITE PROMOTIONAL APPLET PROCESS

(76) Inventor: Adam S. Day, 3511 W. 55th St., Minneapolis, MN (US) 55410

(*) Notice: Subject to any disclaimer, the term of this patent is extended or adjusted under 35 U.S.C. 154(b) by 125 days.

(21) Appl. No.: 09/931,333

(22) Filed: Aug. 16, 2001

(65) Prior Publication Data

US 2002/0065136 A1 May 30, 2002

Related U.S. Application Data

(60) Provisional application No. 60/225,965, filed on Aug. 17, 2000.

(51) Int. Cl.7 .................................................. A63F 13/00
(52) U.S. Cl. ............................ 463/42; 463/9; 434/350; 273/430
(58) Field of Search ................................. 463/9, 40–42, 463/6; 273/430, 454; 434/322, 323, 350

(56) References Cited

U.S. PATENT DOCUMENTS

| | | |
|---|---|---|
| 4,619,457 A | 10/1986 | Small |
| 5,018,975 A | 5/1991 | Todd |
| 5,551,692 A | 9/1996 | Pettit et al. |
| 5,679,075 A | 10/1997 | Forest et al. |
| 5,695,346 A | 12/1997 | Sekiguchi et al. |
| 5,774,874 A | 6/1998 | Veeneman et al. |
| 5,791,991 A | 8/1998 | Small |
| 5,857,911 A | 1/1999 | Fioretti |
| 5,896,686 A | 4/1999 | Howes |
| 5,935,002 A | 8/1999 | Falciglia |
| 5,942,969 A | 8/1999 | Wicks |
| 5,957,458 A | 9/1999 | Haas et al. |
| 6,012,984 A | 1/2000 | Roseman |
| 6,036,601 A | 3/2000 | Heckel |
| 6,039,244 A | 3/2000 | Finsterwald |
| 6,061,660 A | 5/2000 | Eggleston et al. |
| 6,074,299 A | 6/2000 | Cohen |
| 6,102,406 A | 8/2000 | Miles et al. |
| 6,173,267 B1 | 1/2001 | Cairns |
| 6,178,408 B1 | 1/2001 | Copple et al. |
| 6,183,366 B1 | 2/2001 | Goldberg et al. |
| 6,196,920 B1 | 3/2001 | Spaur et al. |
| 6,220,596 B1 | 4/2001 | Horan |
| 6,251,017 B1 | 6/2001 | Leason et al. |

OTHER PUBLICATIONS

Extracts from CyberSurfari Website [http://www.mcs.brandonu.ca/~ennsnr/Cows/rules.htm], CyberSurfari '95 Official Rules. pp1–3.*
International Search Report.

* cited by examiner

*Primary Examiner*—Jessica Harrison
*Assistant Examiner*—Aaron Capron
(74) *Attorney, Agent, or Firm*—Dorsey & Whitney LLP

(57) ABSTRACT

The subject invention includes a host site which is accessed by a participant directly or through a hyperlink from a sponsor site. The host site includes an application which is activated to run a promotional applet on the participant's computer. The promotional applet creates a graphical user interface (GUI) which is used to play a promotional game which requires the participant to browse through a plurality of sponsor sites in order to find and match a number of indicia embedded therein. Once a participant has matched enough indicia to satisfy a winning criteria, the participant is awarded a prize.

31 Claims, 5 Drawing Sheets

WEBSITE PROMOTIONAL APPLET PROCESS

CROSS-REFERENCE TO RELATED APPLICATIONS

This application claims priority from U.S. Provisional Application No. 60/225,965, filed on Aug. 17, 2000, the contents of which are hereby incorporated by reference in its entirety.

FIELD OF THE INVENTION

The invention relates generally to a system and method for promoting an entity. More specifically, the invention relates to a method and system of promoting a plurality of web sites in communication with a computer network, such as the internet.

BACKGROUND OF THE INVENTION

A number of business entities have developed web sites located on the internet to provide services, to display and sell products or to provide information to their customers. However, it is often quite difficult to attract visitors to a web site. Potential visitors must first be made aware of the domain name of the web site and secondly, they must be coaxed into visiting the web site. This process is made more difficult with the large number of web sites being accessible on the Internet.

In order to promote a web site, business entities often use traditional media outlets such as print, radio and TV to advertise a web site. While these traditional methods of promotion may work for its intended purposes, they are often quite expensive. Furthermore, these methods are not assured of reaching the intended audience, most notably, people with a proclivity to transact on the internet.

Partly because of the above, businesses also often advertise their web sites, on other, more popular web sites. These often come in the form of banner ads which are prominently displayed on a web page of the popular web site. The banner ads typically include a graphic or message promoting the business entity and a hyperlink which allows visitor to go directly to the web site of the ad's sponsor. While the banner ads do reach people with a proclivity to transact on the internet, the scope of interest for the popular web site may be limited. Also, the popular web site typically will not reach as large a segment of a community as the traditional media outlets.

Even if traditional advertising and banner ads are successful in luring visitors onto a web site, initially, these methods typically do not create sufficient incentive for the potential visitor to thoroughly browse the contents of a web site. Furthermore, these forms of promotion typically do not generate incentives for a visitor to revisit the website.

Consequently, there is a need for a method and a system for promoting internet web sites which would provide incentives to visit and revisit an internet web site, and which would also provide incentives to thoroughly browse through a web site.

SUMMARY

Accordingly, a novel method and system of promoting a plurality of web sites in communication with a computer network is presented herewith which avoids some of the drawbacks of, and improves upon, the prior art. In one embodiment, the subject invention includes a host site which hosts a web site that is accessed by a participant directly or through a hyperlink from a sponsor site. A sponsor site refers generally to any entity which has paid a fee to be included in the promotional system. The host site also includes a promotional applet which creates a graphical user interface (GUI) which is launched onto the participant's computer, and is used to play a promotional game.

The promotional game requires the participant to browse through a plurality of sponsor sites in order to match indicia embedded therein with indicia located within the GUI. These indicia are changed and relocated periodically amongst the sponsored sites in order to encourage browsing through all the sponsor sites. The participant matches indicia by selecting the indicant within the sponsor site using a cursor control device such as a mouse or a touchpad (otherwise referred to as "clicking" or "clicks"). The host site communicates with the applet to track the indicia discovered and to verify if the indicant is authorized. Once a participant has matched enough indicia to satisfy a winning criteria, the participant is awarded a prize.

The subject method of promotion includes the step of creating a set of indicia and a set of criteria which determines when a participant has won. A subset of indicia are then distributed amongst a number of sponsored sites for embedding within the sponsored site. An applet within the host site creates a GUI which displays a promotional game card that includes a subset of the indicia generated. The GUI also includes a hyperlink to a directory of sponsor sites with hyperlinks to each site. The participant finds and matches indicants on their promotional game card with indicants found within the sponsored sites. The participant clicks on the hyperlinks to different web sites in order to travel to those sites and clicks on each indicant found therein. The host site tracks the participant's movement on the computer network and the indicia which the participant has found.

A system for implementing the subject method will include at least one server in communication with a computer network. The server includes therein an application for tracking the movement of a participant within the computer network and a number of databases to store information. These databases may include a participant database to store participant information and an indicia database for storing the set of indicia and the uniform resource locator (URL) in which they are embedded.

BRIEF DESCRIPTION OF DRAWINGS

For the purpose of facilitating an understanding of the invention, there is illustrated the accompanying drawings, from an inspection of which, when considered in connection with the following description, the invention, its construction and operation, and many of its advantages should be readily understood and appreciated.

DETAILED DESCRIPTION OF THE INVENTION

The subject invention is a method and system of promoting a plurality of web sites in communication with a computer network. For the purposes of illustration, the disclosed embodiment is adapted to be used with the Internet serving as the computer network. However, the subject invention is easily modified and adapted for use on other forms of computer networks, such as an intranet.

I. General Overview

Figure 1:
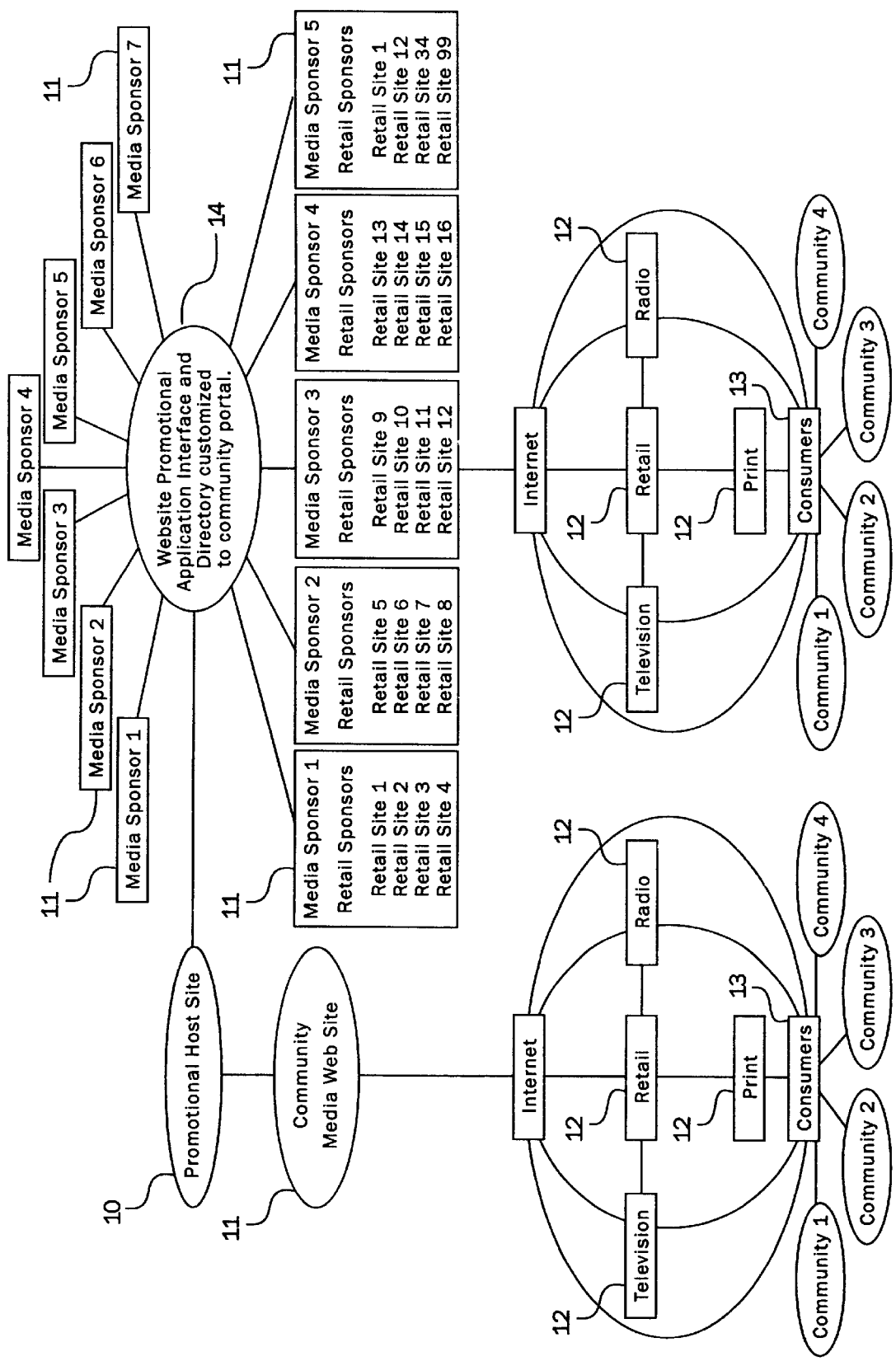
FIG. 1 is a flow chart displaying the interrelations of the entities involved in the subject invention.

As shown in FIG. 1, in one embodiment, the subject invention includes a host site 10 which is accessed by a participant directly or through a hyperlink from a sponsored site 11. A sponsor site 11 refers generally to any entity which has paid a fee to be included in the promotional system and can include various types of web sites including media sites, retail sites, search engine sites, and informative sites. Sponsor sites 11 may also include links to additional sponsor sites 11 therein.

The promotional method can also be supplemented by promotion through traditional media outlets 12 such as print, radio, and television. This promotion will be centered around on how to enter and play a promotional game and the prizes that are available to a winner. The traditional media outlets 12 provide a larger target audience 13 than is available using purely internet based promotional techniques. Furthermore, the collective promotion of the promotional game and the prizes using traditional media outlets 12 may reduce or eliminate the need for an individual sponsor site 11 to use such traditional media outlets 12 for their own self-promotion.

Figure 2:
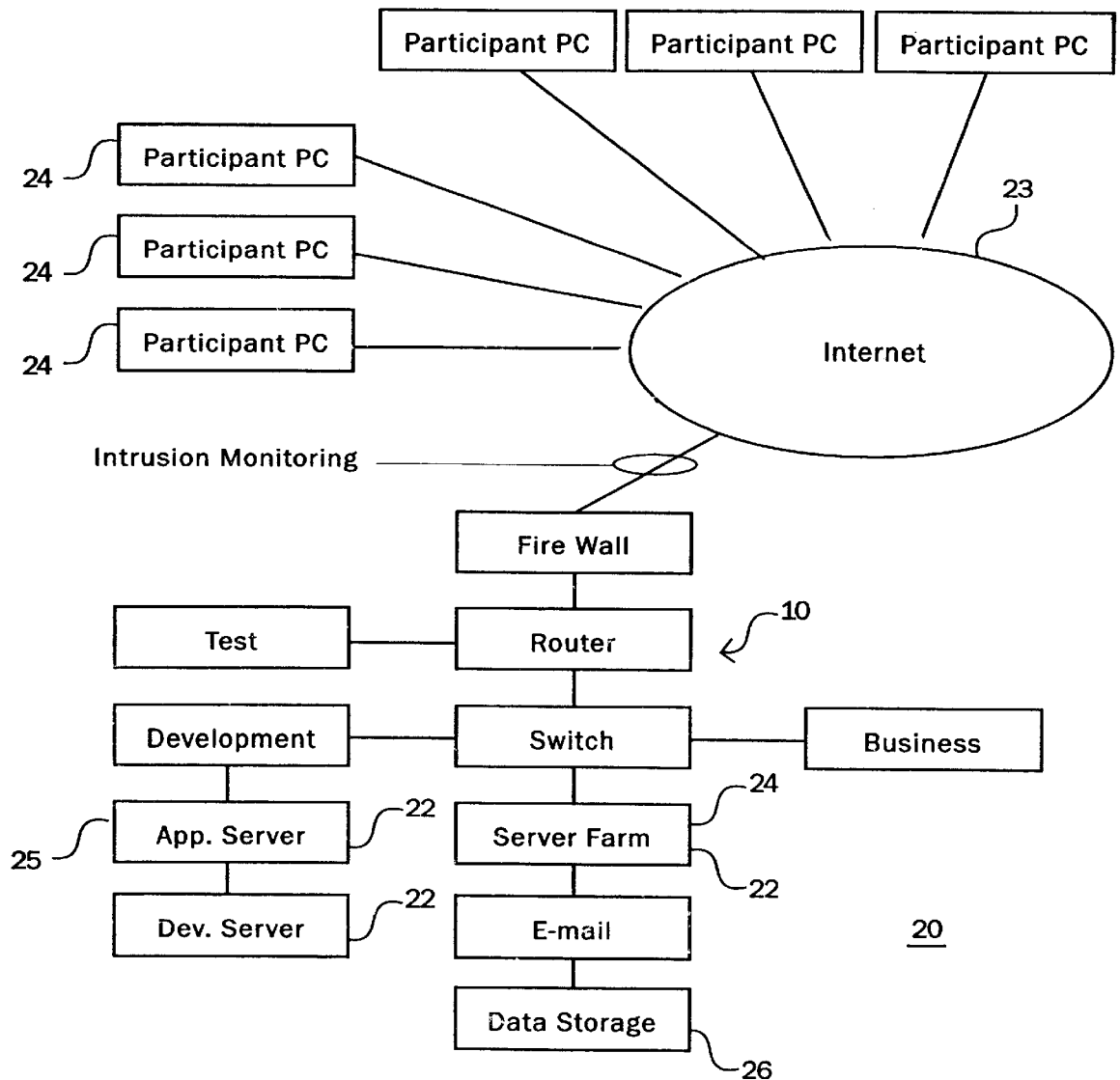
FIG. 2 is a system diagram depicting an embodiment of the subject promotional system.

As shown in FIGS. 1 and 2, the host site 10 includes at least one server 22 in communication with the Internet 23. The server 22 includes a promotional applet therein which generates a GUI which displays a subset of indicia within a promotional game card (the subset has an identifier referred to as the "promotional game card ID"), and a hyperlink to a sponsor site directory having hyperlinks to a plurality of sponsor sites.

The promotional method includes a promotional game that is easily adaptable to have different winning criteria. However, each promotional game is basically played the same way no matter what winning criteria is used. The participant must click on a plurality of links to sponsor sites in order to find indicia therein which are included on a promotional game card, and upon finding a matching indicant, the participant clicks the indicant so that the indicant is marked off on the promotional game card.

For the purposes of explaining the subject invention, the promotional game is won by matching all the indicia in a promotional game card within a predefined amount of sponsor sites clicked. Other promotional games may be tailored to simulate a bingo-like game wherein the participant wins by matching all the indicia within a row or column. The indicia can also be arranged as a trail with each matched indicant being a step in the trail and prizes being awarded at each destination reached. Still other promotional games may have the indicia arranged as pieces of a pie which must be marked off in order to win the prize.

Each indicant matched by the participant undergoes a validation process prior to being marked off on the promotional game card. The host site communicates with the applet in order to track the movement of the participant on the internet and to track the indicia matched. Once a participant has matched enough indicia to satisfy a winning criteria, the participant is awarded a prize.

II. System Configuration

Figure 3:
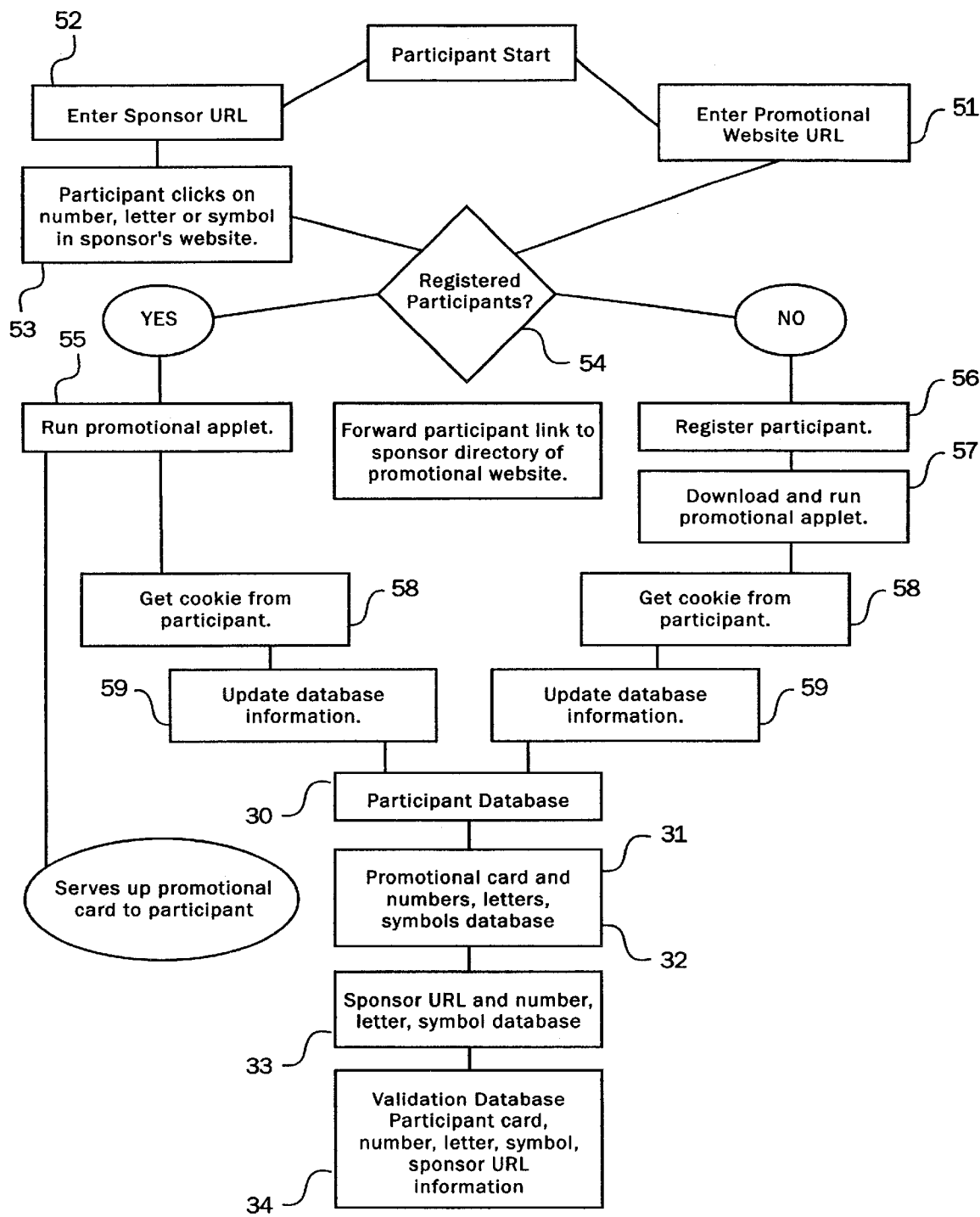
FIG. 3 is a flow diagram of the subject promotional process.

As shown in FIGS. 2 and 3, in one embodiment, the subject invention is implemented by a promotion system 20 comprised of a host site 10 which includes at least one server 22 in communication with the Internet 23. The server 22 can be any computer known to those skilled in the art, including standard attachments and components thereof (e.g., a disk drive, hard drive, CD/DVD player or network server that communicates with a CPV and main memory, a sound board, a keyboard, mouse or printer). The server has therein a number of task-oriented applications.

In one embodiment, the host site 10 includes a promotional web site and includes a web server 24 which hosts the promotional website. The web server 24 utilizes the Internet 23 as a communications backbone and allows information to be passed to the participant's browser. The web server 24 may also include a form handler to collect and process information submitted by a participant through his browser. The host site may also include an application server 25 for running a promotional applet across the Internet 23 onto the participant's computer.

Information communicated between the host site 10 and a participant's browser is typically achieved by the transmission of documents therebetween. These documents are commonly in Hyper Text Markup Language (HTML),but other languages such as DHTML, PEARL, XML, and WAP are also commonly used. Communication between the host site and the browser can also be achieved by other means using methods and computer languages which are generally known in the art.

In one embodiment, the host site includes a number of databases 26 which are utilized to store relevant information. These databases 26 are in communication with the host site, with information being exchanged therebetween. These databases 26 can include a participant database 30, a promotional game card database 31, an indicia database 32, a sponsor URL database 33, and a validation database 34. The participant database 30 stores information pertaining to the participant such as address, phone number, and e-mail address, and a participant ID. The indicia database 32 stores each indicant and the period within which it is valid. The promotional game card database 31 stores a subset of indicia and the sequence it would appear on a promotional game card, and the promotional game card ID for each sequence. The sponsor URL database stores the URLs of every sponsor site and an identifiers for each sponsore site. The validation database 34 stores information generated by the participant while playing the promotional game. This includes the participant ID, the promotional game card ID of the game being played, URLs of the indicia the participant has discovered, URL of valid indicia on the promotional game card, period of validity of indicia on promotional game card.

While the described embodiment includes the above-mentioned databases, the data within these databases is easily arranged and the operation of the subject invention is easily altered so that a fewer or greater number of databases are utilized.

III. Indicia Distribution

Figure 4:
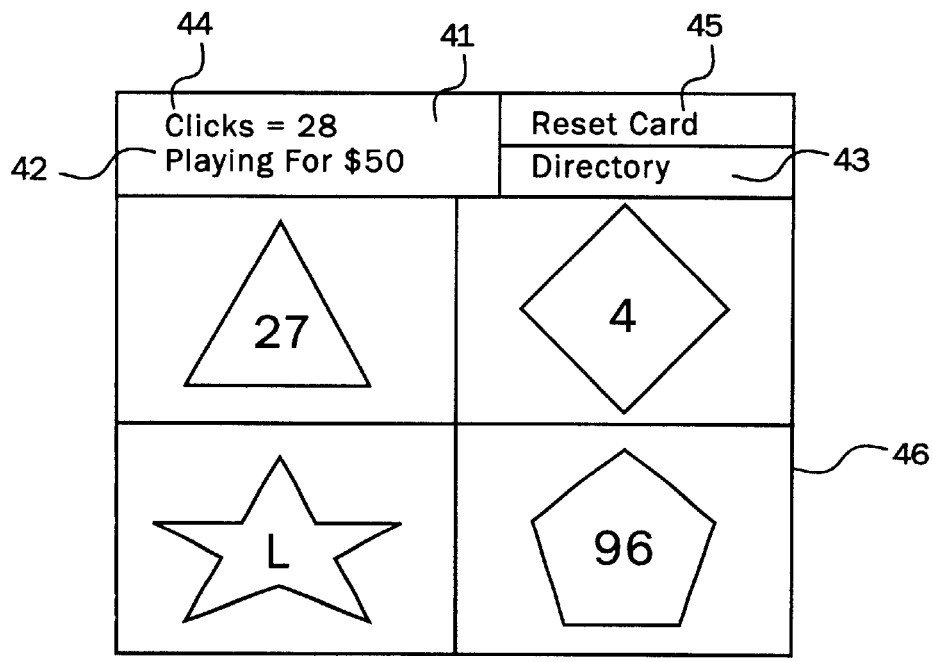
FIG. 4 is an embodiment of a GUI.
Figure 4:
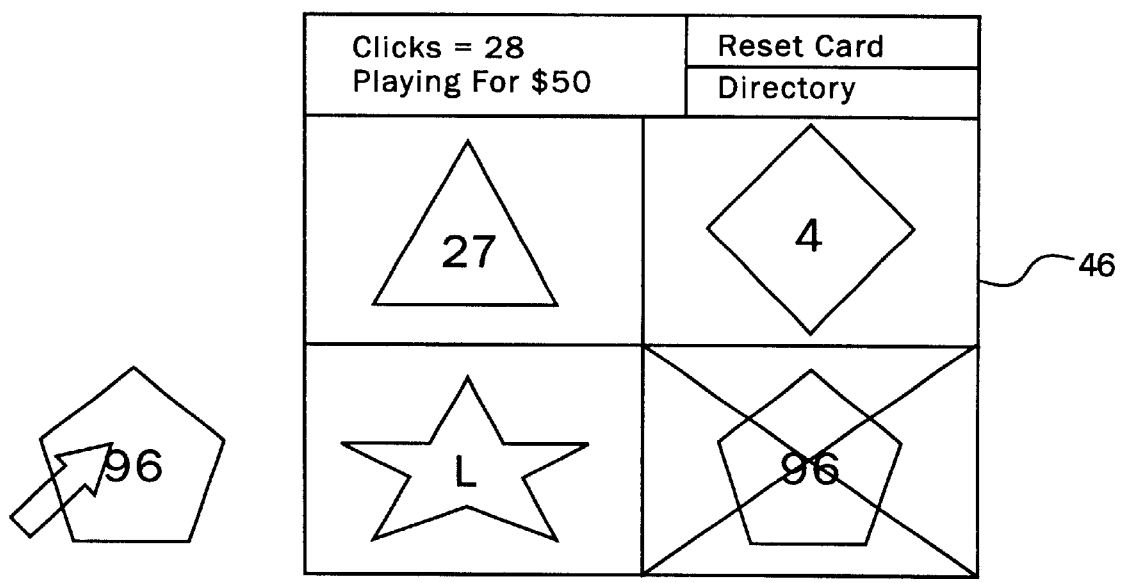

In one embodiment, a unique set of indicia are generated to comprise all the available indicia for a given time period. As shown in FIG. 4, indicia may be comprised of numbers, or letters, or graphic symbols or a combination thereof. Each indicant and the time period within which it is valid is stored in the indicia database 32.

Random subsets of the indicia are then arranged in a plurality of unique sequences which represent locations within a promotional game card. Each sequence is identified by a promotional game card ID. Every sequence with its identifying promotional game card ID is stored within the promotional game card database 31.

A subset of the indicia are distributed to participating sponsor sites as graphic files to be imbedded within a sponsor's website. The graphic file may be a JPEG or GIF file or other known formats for graphic files. The graphic file may include a header or a file name which includes the indicant name, a URL of the sponsor site in which it is located, and the time period within which the indicant is valid.

The distribution of indicia on promotional game cards and the number of indicants distributed to sponsor sites are guided in part by a plurality of factors such as the number of participants, desired win percentage, number of prizes available, number of sponsors, the fee paid by a particular sponsor, and the desired distribution of prizes. Dependant upon which of these factors are controlling, known statistical methods can be used to obtain a satisfactory result. The satisfactory result is achieved by manipulating promotional game variables such as the number of indicia, the number of indicia distributed to the sponsor sites relative to the total number of indicia, the number of different cards that are available, the number of sponsor sites, the number of sponsor sites clicked prior to resetting a promotional game, the number of indicia located within a sponsor site or a combination of these factors.

IV. User Registration

Figure 5:
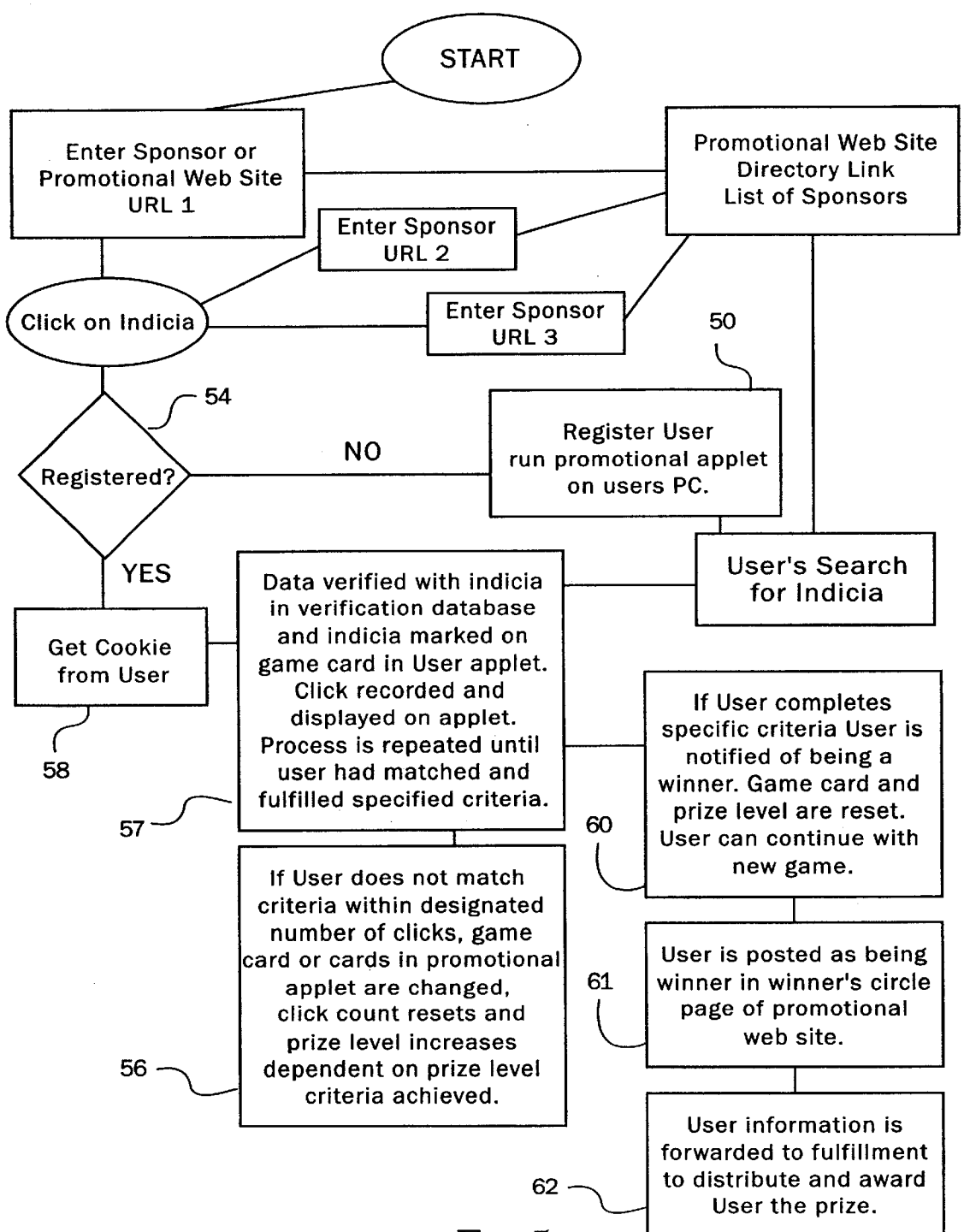
FIG. 5 is a flow diagram of an embodiment of a promotional game

As shown in FIGS. 3 and 5, a participant must first go through a registration process 50 in which participant information is gathered and stored within the participant database. This information will typically include the participant's name, home address, and E-mail address. If the participant has been previously registered, the participant can submit a personal identifier (participant ID) to bypass the registration process. In this embodiment, the identifier is the users E-mail address, but a generated identifier can also be used. Alternatively, a small text file, a "cookie", may be stored on the participant's computer to alert the host site 10 that the participant is currently registered.

In one embodiment, the registration process 50 is achieved through web forms which are submitted by the web server to the participant's web browser. A web form is a collection of form fields displayed as a web page by the participant's browser. By using the web forms, the user is able to fill in requested information on the web form and submit the form to the host site, where the web server and form handler is able to retrieve the information from the web form and store it in the participant's database. Once a participant is completely registered, a participant ID is also stored in the participant's database with the other participant information.

As shown in FIGS. 3 and 5, a user may participate in a promotional game by entering the host web site 51 directly and launching a promotional applet directly, or alternatively, by entering a sponsor web site 52 and clicking on an indicant 53. Either action would trigger the host site 10 to perform a check which identifies if the participant has been previously registered 54. If not previously registered, the host web site 10 performs the registration process. Otherwise, a promotional applet is launched 55 which enables the participant to play a promotional game, or if the promotional applet is currently running, enables the participant to validate the indicant which has been clicked.

V. Promotional Applet

For the purpose of describing the subject invention, the term promotional applet will refer to a single applet or a plurality of applets which individually, or in combination, perform the stated function. The subject promotional method is easily adapted to accommodate the use of a number of applets or a single applet to carry out any functions.

As shown in FIGS. 3, 4, and 5 in one embodiment, once a participant is registered, an application server launches a promotional applet 55 on top of the participant's Internet browser. The promotional applet can be a Java-based application but any other programming language which allows for secure execution of code across a network and across platforms can also be used. The promotional applet creates a first GUI which displays a frame 41 forming a background for a prize indicator 42, a directory hyperlink 43 which links to a directory having a number of sponsor sites and hyperlinks thereto, and a click counter 44 which tracks the number of sponsor sites or indicants which a participant has clicked on during a particular game. The first GUI also tracks the cumulative total of sponsor sites or indicants which a participant has clicked on while playing. A second GUI is created to display a single or a plurality of promotional game cards 46 within the frame, with each having a sequence of indicia obtained from the promotional game card database and identified by a promotional game card ID. Periodically, a third GUI is created in order to provide messages to the participant, the messages may contain advertising, or clues as to the location of a particular indicant, or announce a winner, or any other information that the host site wishes to convey to a participant.

As shown in FIG. 3, once the promotional applet is launched 55, the participant's identifying number, the participant's promotional card ID, and the participant's information are transferred to the validation database 34. Indicant information for each indicant on the participant's promotional game card are also linked to the participant's promotional card ID.

A main component of the promotional method is a promotional game which is played by the participant and which provides incentives to browse through and return repeatedly to the sponsor sites 11. While the promotional game can have varied criteria to determine if a participant has won, the promotional game is basically played the same way regardless of the winning criteria. In order to successfully play a promotional game, the participant must browse through a plurality of sponsor sites in order to find and match indicia embedded therein with indicia on a promotional game card 46.

In this embodiment, the promotional game is won by simply matching all the indicia in the promotional game card 46. Additionally, the participant is required to match all of the indicia on a promotional game card 46 within a predefined number of sponsor sites 11 or indicant clicked.

As shown in FIG. 5, if these criteria are not met 56, or if the participant elects to restart a promotional game the promotional applet relaunches the first and second GUI to display a new promotional game card 46, clear the previous click counter 44, and to display a new prize indicator 42. The new promotional card ID and its related indicant information are also updated within the verification database by the host site 10.

Additional incentives are also incorporated within the promotional game to encourage the participant to continue playing. This incentive may include increasing the value of the prize on subsequent promotional game cards 46 after the participant has clicked on a predefined cumulative total of sponsor sites 11 or indicia. This cumulative total is reset after the participant has elected to exit the promotional applet.

As shown in FIGS. 3, 4 and 5, once a participant finds an indicant within a sponsor's web site, the participant must click on the indicant in order to match it. As stated above, the indicant can be a JPEG file which has a filename containing the name of the indicant, a URL of the sponsor site in which it is located, and the time period within which the indicant is valid. Clicking on the indicant enables the promotional applet 14 to create a cookie with the filename therein. The cookie is stored in a memory location within the participant's PC where the host site 10 is able to access it.

A verification process 57 is undertaken to ensure that the indicant had not been fraudulently or negligently left embedded within a sponsor site. The cookie is read by the host site 58 and the file name is used to obtain indicant information. For example, a file name can be predefined to include indicant information in three segments of four characters each. Using a file name such as BS01SR01WK52, a first segment of the file name "BS01" can be used to indicate the type of indicant, "BS01" representing a blue star having a 1 imprinted therein. A second segment "SR01" comprises a sponsor ID. A third segment "WK52" would represent a period of time in which the indicant is valid, in this example, the $52^{nd}$ week of the calendar year.

The data obtained from the cookie is verified with data located within the validation database. The indicant obtained from the cookie is cross-referenced with the promotional game card ID associated with the participant ID in order to determine if the indicant is located within the game card. The sponsor ID obtained from the cookie can then be cross-referenced using the sponsor URL database to obtain the URL of the sponsor site, and this URL is compared to the URL of the indicant on the promotional game card. The valid period obtained from the cookie is also checked to ensure that the indicant is currently valid. Once verified, the host site uses the information from the cookie to update its verification database and communicates with the promotional applet 14 which then marks off the appropriate indicant on the promotional game card 46.

Once the participant has matched all the required indicia, the promotional game is reset 60 and a new promotional game card 46 is displayed. The participant's name is published on the host site 61 and delivery of the prize is arranged by using the participant information located within the participant database 62.

While the subject invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of indicia in the following claims is merely for convenience and is not intended to suggest that the ordering of the indicia of the claims has any particular significance other than that otherwise expressed by the language of the claims.

What is claimed is:

1. A method of promoting a plurality of sponsored sites in communication with a computer network, the method comprising:
    creating a set of indicia files and a win criteria, each indicia file having a filename;
    distributing the set of indicia files to at least one of the plurality of sponsored sites for embedding within the sponsored site;
    providing an applet for generating a graphical user interface depicting a graphical image of at least one of the indicia files to be found by a participant and for generating a cookie containing the filename of each indicia file accessed by the participant;
    accessing at least one of said generated cookies;
    verifying the indicia accessed by the participant using the filename contained in the cookie; and
    determining when the participant has satisfied the win criteria.

2. The method of claim 1, wherein the computer network is the Internet.

3. The method of claim 2, wherein each sponsored site is a web site hosted by at least one computer in communication with the internet.

4. The method of claim 1, and further comprising the additional steps of tracking the number of times a participant has clicked onto a new sponsor site, and displaying a new subset of indicia when the number of times a participant has clicked onto a new sponsor site exceeds a predefined amount.

5. The method of claim 1, and further comprising the additional steps of determining if a participant is a registered participant, and registering the participant if not previously registered.

6. The method of claim 1, wherein the graphical user interface includes a hyperlink to a directory of sponsored sites.

7. The method of claim 1 and further comprising the additional step of providing a database containing a uniform resource locator wherein each indicant is located.

8. The method of claim 7, and further comprising the additional step of providing a participant database for storing participant information.

9. The method of claim 1, and further comprising dividing at least one indicant filename into predefined segments to obtain indicant information embedded within the filename.

10. The method of claim 9, and further comprising the additional step of comparing indicant information obtained from the filename with indicant information within a validation database.

11. The method of claim 1, wherein the graphical user interface travels with a participant's browser to every sponsor site visited by a participant.

12. The method of claim 1, and further comprising the additional step of matching a uniform resource locator of an indicant within a sponsor site and a uniform resource locator of indicants within a verification database.

13. A system for promoting a plurality of sponsor sites in communication with a communication network, the system comprising:
    at least one server in communication with the communication network, the server including an applet for generating a graphical user interface depicting a graphical image of at least one of the indicia files to be found by a participant and for generating a cookie containing the filename of each indicia file accessed by the participant;
    a participant database in communication with the server, the participant database storing participant information therein wherein the server includes an application for determining if a participant has satisfied a win criteria; and
    an indicant database in communication with the server for storing a set of indicia files and an indication of websites in which the set of indicia files are embedded.

14. The system of claim 13, and further comprising a sponsor database for storing a uniform resource locator for each sponsor site.

15. The system of claim 13, wherein the server includes an application for determining if a participant has discovered an authorized indicant.

16. The system of claim 13, and further comprising a web server hosting a website and an application server, with both in communication with the communication network.

17. The system of claim 13, wherein the server includes an application for extracting a cookie from a participant's computer.

18. A method of promoting a plurality of sponsor sites located on the internet, the method comprising:
   creating a set of indicia files and win criteria, each indicia file having a filename;
   distributing the indicia to a plurality of sponsor sites for embedding within the site;
   displaying on a participant's computer a graphical image of a subset of the plurality of indicia files to be found;
   providing a directory containing links to a plurality of sponsor sites having indicia files embedded therein;
   generating a cookie containing the filename of each indicia file accessed by the participant; and
   determining if the participant has satisfied a win criteria.

19. The method of claim 18, and further comprising the additional step of providing a host web site in communication with the Internet, the host web site containing therein an applet for displaying the subset of indicia to be found.

20. The method of claim 18, wherein the cookie further contains the sponsor site visited by the participant, and a period wherein the indicant is valid.

21. The method of claim 18, and further comprising the additional step of counting every sponsor site clicked by the participant.

22. The method of claim 21, and further comprising the additional step of displaying a new subset of indicia after the participant reaches a predetermined number of sponsor sites clicked.

23. The method of claim 18, wherein graphical images of the indicia are displayed on a game card, and wherein the win criteria is satisfied by finding all the indicia on the game card.

24. The method of claim 18, and further comprising the step of periodically displaying the URL of a site wherein an indicant in the subset of indicants is located.

25. The method of claim 18, wherein the step of displaying a subset includes arranging a subset of indicia in a predefined pattern, creating an identifying number for the arrangement, storing the arrangement and the identifying number in a database, and randomly choosing an arrangement to display.

26. The method of claim 25, wherein the step of determining if a participant has satisfied a winning criteria includes matching the URLs of the location of the indicia with the URLs the participant has visited.

27. The method of claim 18, and further comprising the additional step of increasing a value of a prize to be awarded based on a cumulative number of clicks to sponsor sites counted.

28. The method of claim 18, and further comprising the additional step of counting every indicant clicked by the participant.

29. The method of claim 28, and further comprising the additional step of displaying a new subset of indicia after the participant reaches a predetermined number of indicia clicked.

30. A method of promoting a plurality of sponsor sites located on the internet, the method comprising:
   creating a set of indicia files, wherein the indicia files are graphic files;
   distributing the set of indicia files to the sponsor sites, such that each of the sponsor sites receives at least one indicant file;
   embedding each indicant file within its corresponding sponsor sites;
   launching an applet on a participant's computer, the applet configured to create a
      first GUI on the participant's computer that displays a graphical representation of the set of indicia files and a
      second GUI that contains links to the sponsor sites;
   tracking indicants found by a participant, wherein tracking is performed by the applet, which creates an indication of a found indicant within a cookie on the participant's computer; and
   determining if the participant has satisfied a win criteria, based on the found indicants.

31. The method of claim 30 wherein the GUI includes a second GUI displaying a directory of each sponsors in association with its corresponding sponsor site.

* * * * *